(12) United States Patent
Zhang (10) Patent No.: US 10,121,419 B2
(45) Date of Patent: Nov. 6, 2018

(54) HEAD MOUNTED DISPLAY DEVICE WITH RAPID GAMMA CORRECTION BETWEEN DISPLAY PANELS

(71) Applicant: Google Inc., Mountain View, CA (US)

(72) Inventor: Zhibin Zhang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 43 days.

(21) Appl. No.: 15/349,087

(22) Filed: Nov. 11, 2016

(65) Prior Publication Data

US 2017/0140711 A1 May 18, 2017

Related U.S. Application Data

(60) Provisional application No. 62/254,964, filed on Nov. 13, 2015.

(51) Int. Cl.
*G09G 3/06* (2006.01)
*G09G 3/34* (2006.01)
(Continued)

(52) U.S. Cl.
CPC ......... *G09G 3/3426* (2013.01); *G02B 27/017* (2013.01); *G09G 3/003* (2013.01); *G09G 5/14* (2013.01); *G02B 2027/0118* (2013.01); *G09G 2320/029* (2013.01); *G09G 2320/0233* (2013.01); *G09G 2320/0276* (2013.01); *G09G 2320/041* (2013.01); *G09G 2320/043* (2013.01);
(Continued)

(58) Field of Classification Search
CPC combination set(s) only.
See application file for complete search history.

(56) References Cited

U.S. PATENT DOCUMENTS 5,359,424 A * 10/1994 Kobayashi ........... H04N 1/4058
347/172
6,806,903 B1 * 10/2004 Okisu ..................... G06K 9/38
348/222.1
(Continued)

FOREIGN PATENT DOCUMENTS

JP          200604795          2/2006

OTHER PUBLICATIONS

Takayama Tomohiko JP2006041795 Feb. 9, 2006 Image Display Apparatus (English Translation) (Year: 2006).*
(Continued)

*Primary Examiner* — Van N Chow (57) ABSTRACT

A head mounted display (HMD) device periodically measures a gamma characteristic of each of a plurality of display panels, then adjusts the characteristic of one of the panels to closely match the other. For example, the HMD device can periodically apply a set of currents to selected pixels at each display panel and measure the resulting sets of voltages at the selected pixels. The set of voltages for each display panel indicates the gamma characteristic of the corresponding panel. The HMD device can apply the sets of voltages to a filter to generate a gamma figure of merit (FOM) for each display panel, and adjust a bias (e.g., a backlight bias or a bias of a light emitting diode (LED)) of one or more of the display panels, so that each display panel exhibits similar gamma characteristics.

18 Claims, 5 Drawing Sheets

(51) Int. Cl.
    *G09G 3/00*           (2006.01)
    *G09G 5/14*           (2006.01)
    *G02B 27/01*         (2006.01)

(52) U.S. Cl.
    CPC ... *G09G 2320/045* (2013.01); *G09G 2320/06* (2013.01); *G09G 2320/0626* (2013.01); *G09G 2320/0673* (2013.01); *G09G 2320/0693* (2013.01); *G09G 2360/16* (2013.01)

(56) References Cited

U.S. PATENT DOCUMENTS

| | | |
|---|---|---|
| 7,227,519 B1 | 6/2007 | Toru et al. |
| 8,957,840 B2 * | 2/2015 | Shin .................... G09G 3/3607 345/690 |
| 2009/0303162 A1 | 12/2009 | Khono et al. |
| 2012/0299817 A1 | 11/2012 | Atkins et al. |
| 2013/0147859 A1 | 6/2013 | Kobayashi |
| 2015/0091949 A1 | 4/2015 | Kim et al. |

OTHER PUBLICATIONS

Invitation to Pay Additional Fees and, Where Applicable, Protest Fee and Partial Search Report corresponding to PCT/US2016/061475 dated Mar. 2, 2017, 9 pages.
Written Opinion of the International Preliminary Examining Authority dated Nov. 2, 2017 for PCT/US2016/061475, 8 pages.
International Search Report and Written Opinion correlating to PCT/US2016/061475 dated Jun. 29, 2017, 24 pages.
International Preliminary Report on Patentability dated Feb. 1, 2018 for PCT Application No. PCT/US2016/061475, 26 pages.

\* cited by examiner

HEAD MOUNTED DISPLAY DEVICE WITH RAPID GAMMA CORRECTION BETWEEN DISPLAY PANELS

BACKGROUND

Field of the Disclosure

The present disclosure relates generally to display devices and, more particularly, to head mounted display devices.

Description of the Related Art

Head mounted display (HMD) devices are used in a variety of virtual reality (VR) and augmented reality (AR) systems. The HMD device typically includes one or more display devices to present stereoscopic imagery to the user, thereby virtually immersing the user a three-dimensional (3D) scene. The display devices can include, for example, a single flat display separated into two independent display regions, one for the left eye and one for the right eye of the user. Due to increasing pixel density requirements and higher frame update rates, other devices employ a pair of independent flat displays, one for each eye of the user. However, variations between the display devices can cause variations in the presentation of the stereoscopic imagery and visible artifacts leading to an unsatisfying user experience. For example, such variations can substantially impact the illusion of immersion an HMD device is designed to provide.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for correcting for variations between gamma characteristics of different display panels of an HMD device. Such variations can result from temperature disparities between the display panels, process variations during manufacture of the panels, and other disparities. To address these gamma characteristic variations, the HMD device periodically measures a gamma characteristic of each display panel, then adjusts the characteristic of one of the panels to closely match the other. For example, the HMD device can periodically apply a set of currents to selected pixels at each display panel and measure the resulting sets of voltages at the selected pixels. The set of voltages for each display panel indicates the gamma characteristic of the corresponding panel. The HMD device can apply the sets of voltages to a filter to generate a gamma figure of merit (FOM) for each display panel, and adjust a bias (e.g., a backlight bias or a bias of a light emitting diode (LED)) of one or more of the display panels, so that each display panel exhibits similar gamma characteristics.

By correcting for variations between the gamma characteristics of the different display panels, the HMD device can provide a more satisfying user experience. In particular, variations in the gamma characteristics of the different display panels can result in imagery being presented at the different display panels with different color, brightness, or other visual characteristics. These differences in the present imagery can be visible to the user and thus significantly impact the immersion of the VR or AR application that generates the imagery.

Figure 1:
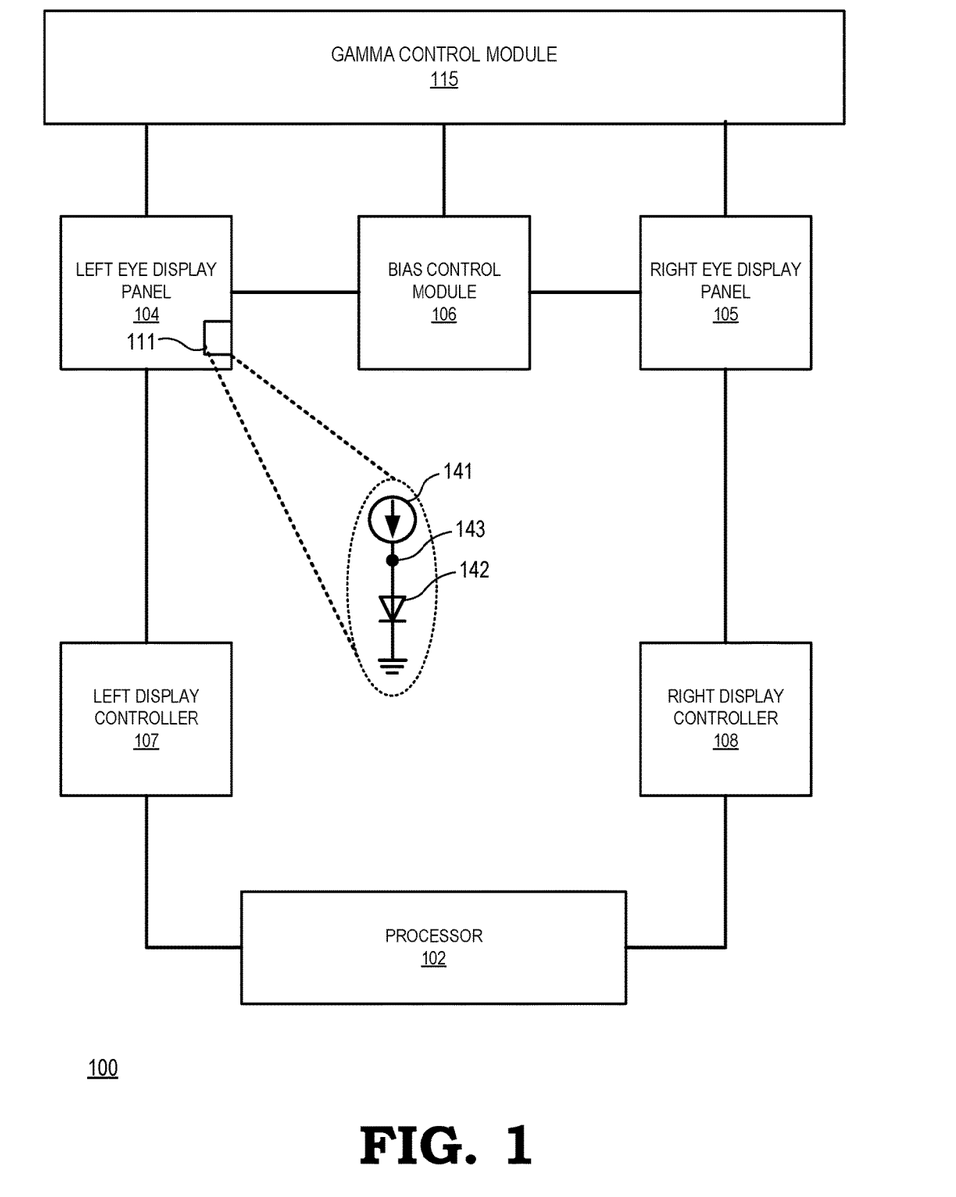
FIG. 1 is a block diagram of a display system of a head mounted display (HMD) that corrects for variations in gamma characteristics between display panels in accordance with at least one embodiment of the present disclosure.

FIG. 1 illustrates a block diagram of a display system 100 of an HMD device in accordance with at least one embodiment of the present disclosure. In the depicted example, the display system 100 employs a pair of display panels, designated display panel 104 and display panel 105 respectively, to present imagery to a user of the HMD device. For purposes of description, it is assumed that the HMD device has an "eyeglass" or "goggle" form factor, wherein each of the display panels 104 and 105 is mounted so that the imagery displayed at the display panel is directed at a corresponding eye of the user. Thus, in the example of FIG. 1, display panel 104 is the left eye display panel and display panel 105 is the right eye display panel. The display panels 104 and 105 may be implemented using any of a variety of display technologies capable of providing a display panel with a varying curvature or orientation configuration, such as a thin-film flexible organic light emitting diode (OLED)-based display that is flexed into the desired curvatures and sectional orientations and maintained as such via a supporting frame. In another embodiment, the display panels 104 and 105 may employ a display technology, such as liquid crystal display (LCD) technology, that employs a backlight to set a luminance for the pixels of the corresponding display panel.

Imagery for each of the display panels is generated by a processor 102 of the display system 100. In at least one embodiment, the processor 102 executes one or more VR or AR programs and, in the course of executing these programs, generates frames for display at each of the display panels 104 and 105. The VR and AR programs can coordinate generation and presentation of the display frames to provide an immersive VR or AR experience for the user. For example, the VR and AR programs can generate and coordinate presentation of the display frames so that the display panels 104 and 105 together display stereoscopic imagery to the user in order to immerse the user in a 3D scene.

To facilitate display of imagery at the display panels 104 and 105, the display system 100 includes display controllers 107 and 108. The display controllers 107 and 108 are connected to display panels 104 and 105, respectively, and each display controller is generally configured to perform rendering of display frames for its connected display panel. In addition, each of the display controllers 107 and 108 can perform other operations associated with rendering and display of imagery, including image compositing, frame buffering, synchronization with the other display controller, and the like.

Each of the display panels 104 and 105 is composed of an array of pixels. As used herein, a pixel of a display panel refers to either or both the point where a particular point of light is generated at the panel, and to the circuitry, including transistors, diodes, and the like, used to generate the light at that point. To generate an image based on a frame, the display controllers 107 and 108 render the frame by generating currents or voltages to be applied to each pixel (that is, to the circuitry corresponding to each pixel) so that the pixel displays light of the color and intensity indicated by the frame at the point corresponding to the pixel. Each of the display panels has a gamma characteristic, indicating the responsiveness, in brightness of the display panel to voltages or currents applied to the pixels of the display panel. As in understood in the art, the gamma characteristic of a display panel typically varies non-linearly with respect to the applied current or voltage. This variation is sometimes expressed in the form of a gamma curve for the display panel.

In at least one embodiment, after manufacture of the display system 100, tests are performed on each of the display panels 104 and 105, or on a test system corresponding thereto, to identify a nominal gamma curve for each of the display panels 104 and 105. In at least one embodiment, to ensure that images are displayed with the appropriate brightness, each of the display controllers 107 and 108 modifies the voltage or current to be applied to each pixel based on the nominal gamma curve, so that the brightness of each pixel varies in a substantially linear fashion with the applied voltage or current. The modifications, as they vary with respect to applied current or voltage, is referred to as the nominal gamma correction curve for the display panel. However, in many cases the gamma curve for one or both of the display panels 104 and 105 will differ from the nominal gamma curve because of various factors including process variations during manufacture, operating conditions such as temperature, aging of the panels and the like. Further, the gamma curves for the display panels 104 and 105 are likely to vary from the nominal gamma curve in different ways. That is, during operation the gamma curve for the display panel 104 is likely to be different than the gamma curve for the display panel 105. Accordingly, as explained further with respect to FIG. 2, the application of the nominal gamma correction curve by the display controllers 107 and 108 would result in the image displayed at the display panel 104 to have a different brightness than the corresponding image displayed at the display panel 105. This difference in brightness is likely to be noticeable to the user, and may cause errors in stereoscopic presentation of a 3D image or otherwise result in a poor user experience.

To address this variation in gamma characteristics between the display panels 104 and 105, the display system 100 employs a bias control module 106 and a gamma correction module 115. In at least one embodiment, one or more portions of the bias control module 106 and the gamma correction module 115 can be implemented at a field programmable gate array (FPGA) or Complex Programmable Logic Device (CPLD) or microcontroller connected to the processor 102. In at least one other embodiment, one or more portions of the bias control module 106 and the gamma correction module 115 are implemented at the processor 102.

The bias control module 106 applies individual bias signals to the display panels 104 and 105 to adjust a brightness or luminosity of the corresponding display panel. In at least one embodiment, each bias signal adjusts a backlight of the corresponding display panel, effectively adjusting the gamma characteristic for the display panel. In another embodiment, the bias signal applied by the bias control module 106 is a reference voltage for light emitting diodes (LEDs) of the display panels 104 and 105.

The gamma correction module 115 is generally configured to send a control signal to the bias control module 106 so that the gamma characteristics of the display panels 104 and 105 substantially match. In particular, the gamma correction module 115 is configured to identify any difference between the gamma characteristics for the display panels 104 and 105. Based on this difference, the gamma correction module 115 identifies an adjustment to the gamma characteristics for at least one of the display panels 104 and 105 so that the gamma characteristics of the display panels 104 and 105 will substantially match, and sends a control signal to the bias control module 106 reflecting the adjustment. In response to the control signal, the bias control module 106 adjusts the bias signal for the corresponding display panel, thereby ensuring that the gamma characteristics of the display panels substantially match.

In at least one embodiment, the gamma correction module 115 identifies the difference between the gamma characteristics of the display panels 104 and 105 by testing the gamma characteristics at periodic intervals, such as during each horizontal or vertical synchronization period of the display panels 104 and 105. To test the gamma characteristics, the gamma correction module 115 selects a test pixel at each of the display panels 104 and 105 and applies a set of currents to each test pixel in series. The gamma correction module 115 measures, at each test pixel, the set of voltages resulting from the set of currents. To illustrate, the display panel 104 includes a test pixel 111. In at least one embodiment, the test pixel 111 is a diode 142 connected to a variable current source 141 at one terminal (the anode terminal) and connected to a ground reference voltage at the other terminal (the cathode terminal. The set of voltages are read at a node 143 at the anode terminal as the variable current source 141 is controlled to apply the set of currents to the diode. In at least one embodiment, the set of voltages are represented by a set of corresponding digital voltage values.

The gamma correction module 115 applies the set of voltages values to a filter, which generates a gamma figure of merit (FOM) for the display panels 104 and 105. The gamma FOM indicates the difference in gamma characteristics of the display panels at the time that the sets of currents are applied to the test pixels. In at least one embodiment, the gamma FOM is calculated according to the following formula:

$$FOM = \frac{\sum_{i=1}^{N-1}(VL_i + VL_{i+1})}{\sum_{i=1}^{N-1}(VR_i + VR_{i+1})} - 1$$

where N is the number of voltage values in each voltage value set (e.g., eight), $VL_i$ is the ith voltage in the set of voltage values for the left display panel 104, and $VR_i$ is the ith voltage in the set of voltages for the right display panel 105. Based on this difference, the gamma correction module 115 sends a control signal to the bias control module 106 to adjust the gamma characteristics of the display panels 104 and 105 so that their gamma characteristics substantially match. In at least one embodiment, the left display panel 104 bias is left unchanged and the bias for the right display panel is adjusted (or vice versa) according to the following formula:

$$\text{bias} = K_c * \text{FOM}$$

where $K_c$ is a calibration constant identified empirically for the display panels 104 and 105 to ensure the gamma characteristics of the panels match. In at least one embodiment the gamma correction module 115 changes the bias only if the FOM difference exceeds a threshold value such as 0.5 percent or utilizes another threshold hysteresis in order to prevent distracting oscillation of the gamma characteristics of the display panel 105.

Figure 2:
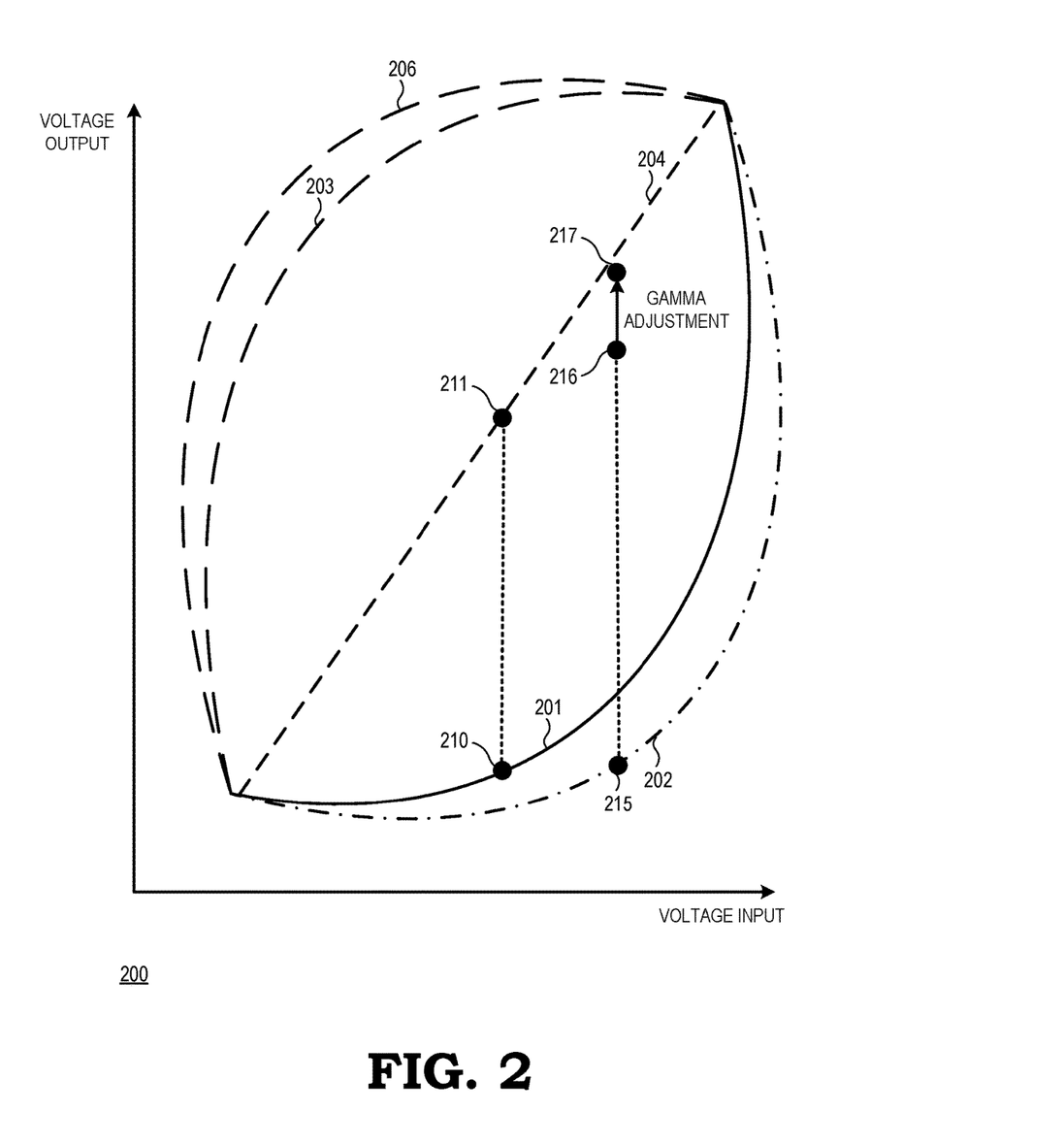
FIG. 2 is a diagram illustrating an example of the display system of FIG. 1 correcting for variations in gamma characteristics between display panels in accordance with at least one embodiment of the present disclosure.

FIG. 2 illustrates an example of adjusting the gamma characteristic of the display panel 105 in accordance with at least one embodiment of the present disclosure. In particular, FIG. 2 depicts a graph 200 with curves 201, 202, 203, 204, and 206. The graph 200 includes an x-axis representing voltage magnitude as applied to a pixel of a display panel and a y-axis indicating a corresponding voltage output for the pixel, which indicates pixel luminosity with the consideration of the display optic response. Curve 201 represents the gamma curve for the display panel 104 and curve 202 represents the gamma curve for the display panel 105. Curve 203 represents the nominal gamma correction curve for the display panels 104, curve 206 represents the nominal gamma correction curve for the display panel 105, and curve 204 represents the linear transfer function expected if the nominal gamma correction curves were applied to image data for the display panels 104 and 105.

In the example of FIG. 2, the gamma curve 201 is assumed to substantially match the nominal gamma curve for the display panels 104 and 105. Thus, application of the nominal gamma correction curve 203 to image data for the display panel 104 should result in a transfer function substantially represented by curve 204. An example is indicated by points 210 and 211. In particular, point 210 indicates a base voltage value indicated by image data for a pixel of the display panel 104. Point 211 represents the voltage value for the pixel after the nominal gamma correction curve 203 has been applied to point 210. Thus, application of the nominal gamma correction curve 203 results in point 210 being placed on or near curve 204.

In contrast to the gamma curve 201, the gamma curve 202 for the display panel 105 does not match a different nominal gamma curve 206. This indicates that process variations, operational conditions such as temperature, and other factors have changed the gamma curve 202 from the nominal state. However, individual gamma correction of the display panels based on different nominal gamma curves for the display panels 104 and 105 is computationally intense, and therefore unsuitable for many VR and AR applications. Visually, this means that images displayed at the display panel 105 will appear of different brightness to the user than images displayed at the display panel 104. This disparity in brightness can impact the quality of the "3D effect" of stereoscopic images presented at the display panels 104 and 105, and otherwise have a deleterious impact on the user experience. To address this disparity, the gamma correction module 115 adjusts the gamma characteristic of the display panel 105 so that its brightness matches than of display panel 104.

An example of this gamma adjustment is illustrated by points 215, 216, and 217. In particular, point 215 indicates a base voltage value indicated by image data for a pixel of the display panel 105. Point 216 represents the voltage value for the pixel after the nominal gamma correction curve 203 has been applied to point 215. As illustrated, the point 210 is below curve 204 along the y-axis. Further, the gamma-corrected points of display panel 104 closely match the points of curve 204 (because the gamma curve 201 of display panel 104 closely matches the nominal gamma curve). Therefore, in order for point 215 to be displayed with brightness sufficient to match display panel 104, point 216 must be moved to curve 204. Accordingly, by adjusting a corresponding bias signal, the gamma correction module 115 adjusts the gamma characteristic of display panel 105 to move point 216 to point 217 on curve 204. The gamma correction module 115 thereby substantially matches the brightness of images displayed at the display panels 104 and 105.

To determine the amount by which to adjust the gamma characteristic of display panel 105, the gamma correction module 115 applies a set of currents to the test pixels, as described above with respect to FIG. 1. The resulting voltages, together with their corresponding applied currents, provide a mapping of at least a portion of the gamma curve for the corresponding display panel. The voltages are filtered to generate the gamma FOM for the display panels 104 and 105, with the gamma FOM indicating the difference between the gamma curves for the display panels 104 and 105. The gamma correction module 115 changes the bias for one or both of the display panels 104 and 105 based on the difference in the gamma FOMs so that the gamma curves for the display panels 104 and 105 substantially match. This ensures that the brightness of images displayed at each of the display panels 104 and 105 is substantially similar, improving the user experience.

Figure 3:
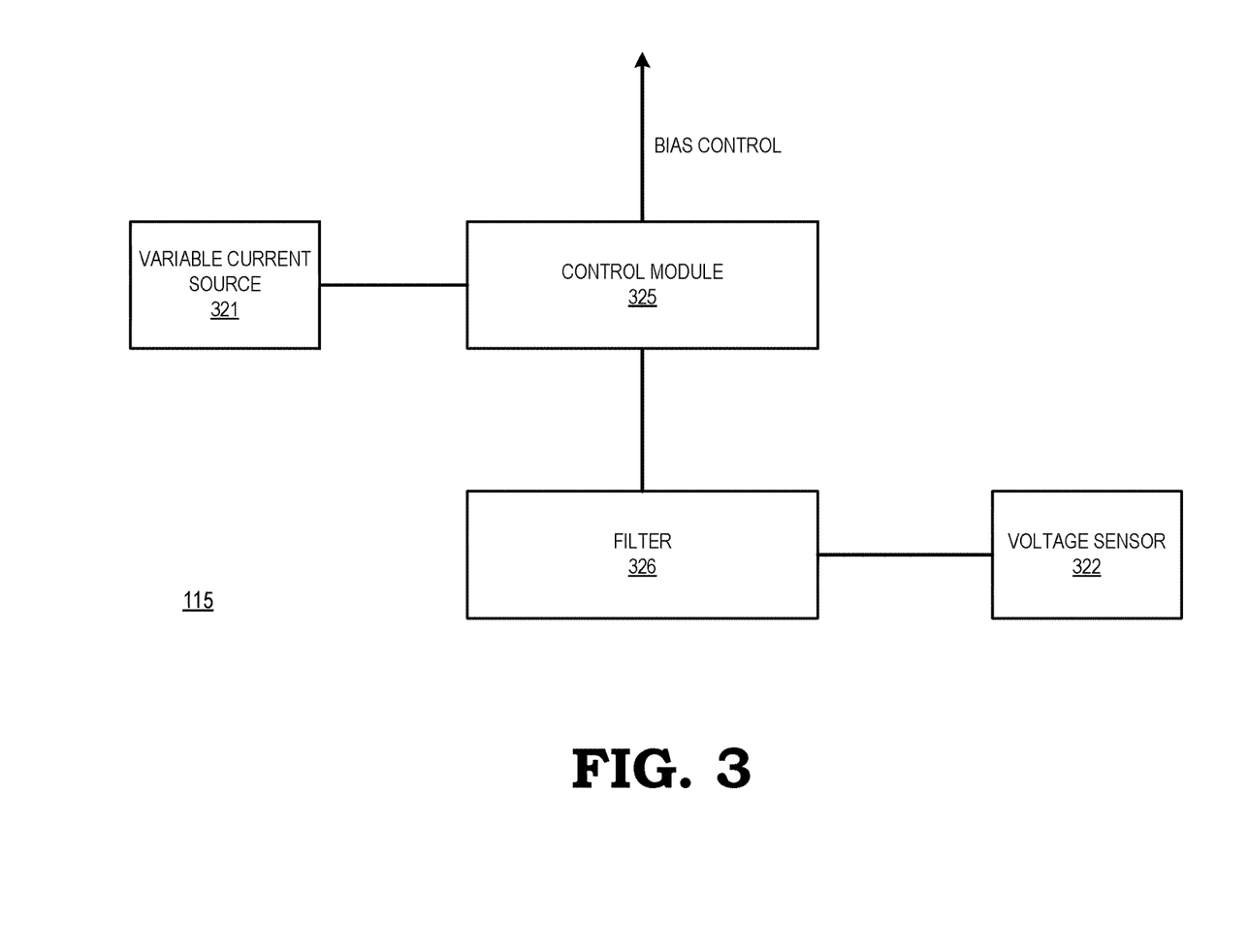
FIG. 3 is a block diagram of a gamma correction module of the display system of FIG. 1 in accordance with at least one embodiment of the present disclosure.

FIG. 3 illustrates a block diagram of the gamma correction module 115 in accordance with at least one embodiment of the present disclosure. In the depicted example, the gamma correction module 115 includes a variable current source 321, a voltage sensor 322, a control module 325, and a filter 326. The variable current source 321 is a current source that can apply a current to one or more test pixels at the display panels 104 and 105. The variable current source 312 can vary the magnitude of the applied current based on a control signal received from the control module 325 as described further below.

The voltage sensor 322 is configured to sense voltages at the test pixels of the display panels 104 and 105 based on the currents applied by the variable current source 321. For each test pixel, the voltage sensor 322 supplies the set of voltages resulting from the set of applied currents to the filter 326. The filter 326 is configured to generate a value based on each set of voltages supplied by the voltage sensor 322. The generated value is a FOM indicating the gamma characteristic for the display panel that generated the set of voltages. The filter 326 can be an active filter, such as a Sallen-Key filter, a passive filter, and the like.

The control module 325 is configured to control the modules of the gamma correction module 115 in order to generate a bias control signal that adjusts the gamma characteristics of the display panels 104 and 105 so that their gamma curves are substantially similar. In operation, the control module 325 receives an indication that a synchronization period of the display panels 104 and 105, such as a horizontal synch period, has initiated. In response the control module 325 selects a test pixel of the display panel 104 and sends a control signal to the variable current source 321 to apply a set of currents to the test pixel. In response, the variable current source 321 generates and applies the set of currents (e.g., a set of eight different currents) to the indicated test pixel, causing the test pixel to generate a corresponding set of voltages (e.g., a corresponding set of eight voltages). The set of voltages are sensed by the voltage sensor 322, which applies the set of voltages to the filter 326. In response to the set of voltages, the filter 326 generates a value corresponding to a figure of merit for the display panel 104 that indicates the display panel's gamma characteristic. The control module 325 receives the FOM from the filter and stores it at a register (not shown).

The control module 325 then selects a test pixel of the display panel 105 and proceeds to have the set of currents applied to that test pixel, in similar fashion to that described above with respect to the test pixel of the display panel 104. The filter 326 in turn generates an FOM for the display panel 105 in similar fashion to that described above. The control module 325 identifies the difference between the FOM value for the display panel 104 and the FOM value for the display panel 105. Based on this difference, the control module 325 sets the bias control signal for the bias control module 106 so that the gamma curves of the display panels 104 and 105 substantially match.

Figure 4:
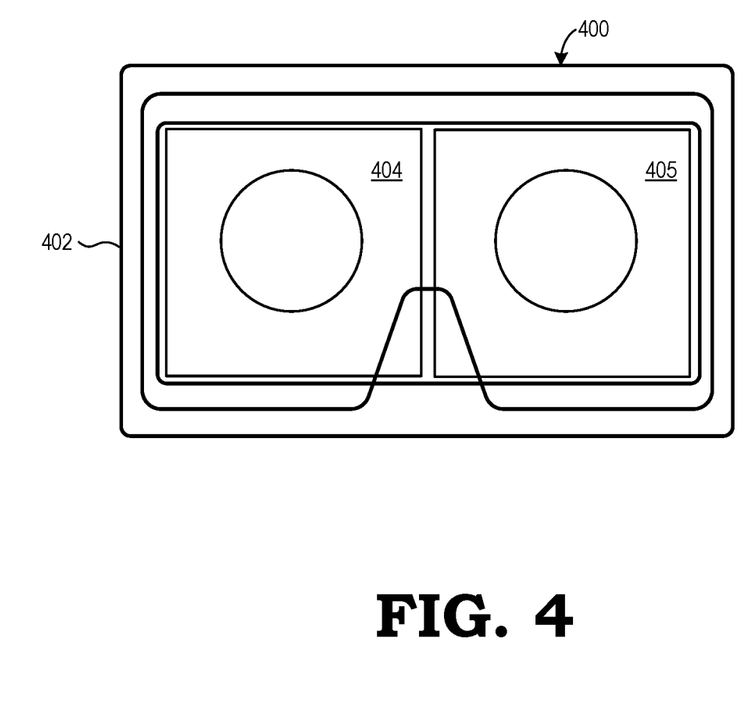
FIG. 4 is a diagram illustrating a rear perspective view of a head mounted display (HMD) device employing the display system of FIG. 1 in accordance with at least one embodiment of the present disclosure.

FIG. 4 illustrates a rear view of an HMD device 400 that can include the display system 100 of FIG. 1 in accordance with at least one embodiment of the present disclosure. As illustrated, the HMD device 400 has an "eyeglass" form factor. That is, the HMD device 400 can be mounted to a user's face by positioning arms (not shown) behind the user's ears. However, in other embodiments the HMD device 400 may be implemented with a "mask" or "goggles" form factor in which the HMD device 400 is mounted to the user's face via straps or other attachment devices. Further, although omitted for ease of illustration, the HMD device 400 also may include one or more face gaskets to seal against the user's face for the purposes of limiting ambient light intrusion.

The HMD device 400 includes a pair of display panels 404 and 405, corresponding to display panels 104 and 105 of FIG. 1. The display panels 404 and 405 are mounted in a frame 402 attached to the arms. The HMD device 400 further includes a frame 406 (e.g., via the bridge of the frame 406).

Figure 5:
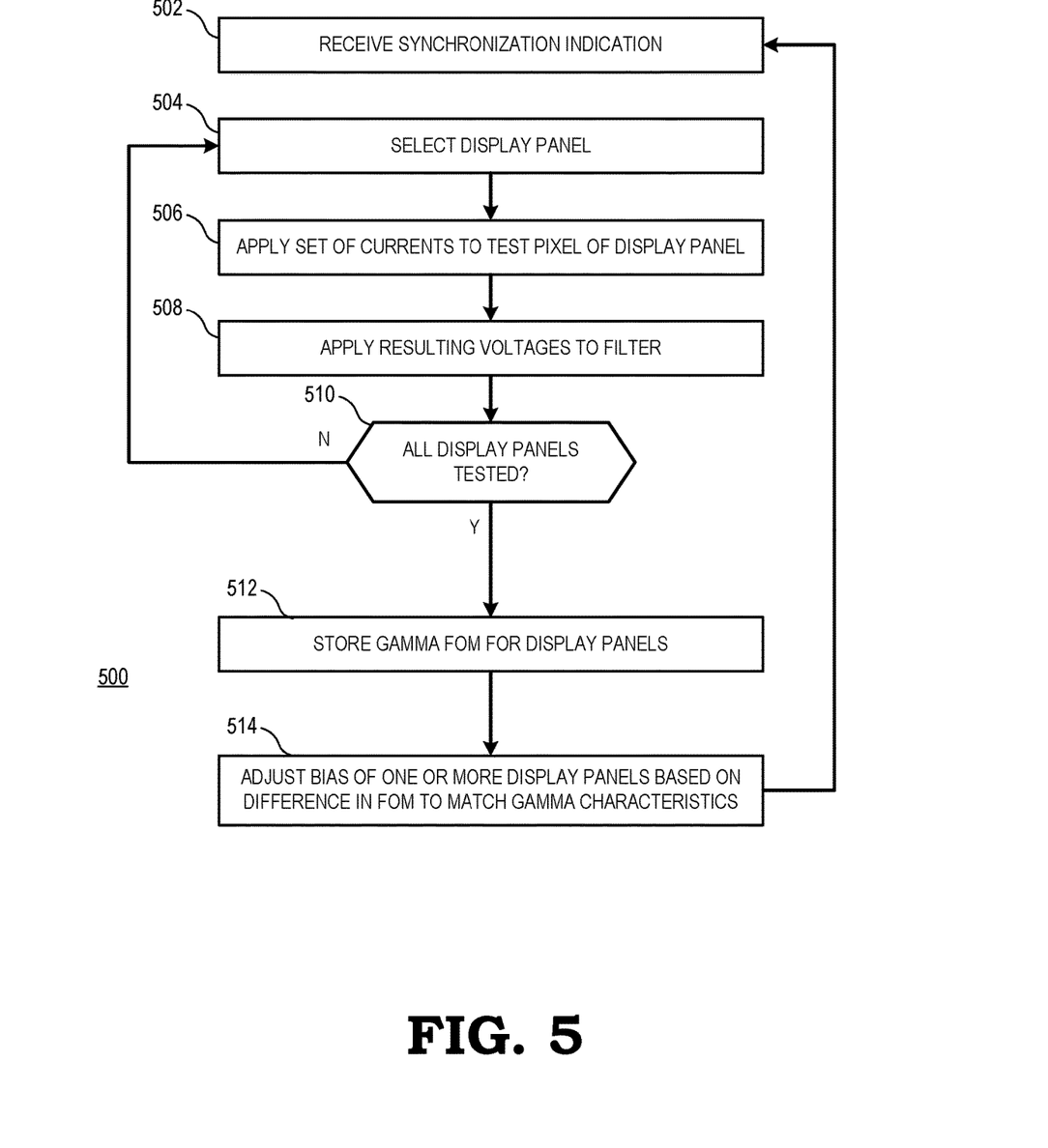
FIG. 5 is a flow diagram of a method of correcting for variations in gamma characteristics between display panels of an HMD device in accordance with at least one embodiment of the present disclosure.

FIG. 5 is a flow diagram of a method 500 of correcting for variations in gamma characteristics between display modules of an HMD device in accordance with at least one embodiment. For purposes of description, the method 500 is described with respect to an example implementation at the display system 100 of FIG. 1. At block 502 the gamma correction module 115 receives a synchronization signal indicating that the display panels 104 and 105 have entered, or are about to enter, a synchronization period such as a horizontal synchronization period or vertical synchronization period as images are displayed at the display panels 104 and 105. In response, at block 504 the gamma correction module 115 selects the display panel 104. At block 506 the gamma correction module 115 selects the test pixel for the display panel 104 and at block 506 applies a set of currents to the test pixel to determine the panel's gamma characteristic. At block 508 the gamma correction module 115 senses the set of voltages at the test pixel resulting from the application of the set of currents and applies the set of voltages to a filter, which generates a gamma FOM display panels.

At block 510 the gamma correction module 115 determines if it has generated voltage sets for each display. If not, the method flow returns to block 504 and the gamma correction module 115 selects the next display panel (e.g., display panel 105) and proceeds to apply a set of currents to the test pixel for the selected display panel in similar fashion to that described above. The gamma correction module 115 thus generates and voltage sets for each display panel of the HMD device.

After a set of voltages for each display panel has been generated, and each set of voltages applied to the filter, the output of the filter will indicate the FOM for the display panels indicating the difference in the panels' gamma characteristics. Accordingly, returning to block 510, in response to the gamma correction module identifying that it has generated a set of voltages at the test pixels for each display panel, the method flow moves to block 512 and the gamma correction module 115 stores the gamma FOM for the display panels. The method proceeds to block 514 and the gamma correction module 115 adjusts the bias for one or more of the display panels based on the FOM so that the gamma characteristics of the display panels substantially match. This ensures that images are displayed at the different display panels with similar brightness, improving the user experience.

After the gamma correction module 115 adjusts the bias of the one or more display panels, the method returns to block 502 and the gamma correction module 115 awaits another indication of a synchronization period for the display panels. Thus, in the illustrated example, the gamma correction module 115 periodically (e.g., during each synchronization period) determines a gamma FOM for each display panel and adjusts the bias of one or more of the display panels based on the determined gamma FOMs. The gamma correction module 115 thereby accounts for changes in the gamma characteristics of the display panels resulting in changes to operating conditions of the panels, such as changes in temperature. Thus, for example, the gamma correction module 115 may identify a gamma FOM for the display panels 104 and 105 at a first time (e.g., during a first synchronization period) and make an adjustment to the bias of the display panel 105 based on the identified gamma FOM. At a second, later time (e.g., during a subsequent synchronization period), the gamma correction module 115 may identify a different FOM for the display panels 104 and 105, the different FOM resulting from changes in ambient temperature of the panels or other operating condition changes. The gamma correction module 115 can then readjust the bias of the display panel 105 to account for the changes in the FOM, ensuring that the gamma characteristics of the display panels 104 and 105 substantially match in the face of changing operating conditions. Further, in at least one embodiment, the calculation of the FOM (including application of the test currents at each test pixel) and adjustment of the bias for one or more of the display panels is completed during the synchronization period, so that any adjustment in gamma characteristics is not visible to the user, improving the user experience.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a head mounted display (HMD) device comprising first and second display panels, a method comprising:
   identifying a first gamma characteristic of the first display panel by applying a set of currents to a first pixel of the first display panel causing the first pixel to generate a corresponding set of voltages;
   identifying a second gamma characteristic of the second display panel by applying the set of currents to a second pixel of the second display panel causing the second pixel to generate a corresponding set of voltages;
   identifying any difference between the first and second gamma characteristics;
   when a difference is identified, identifying an adjustment to the second gamma characteristic, based on the difference, so that the first and second gamma characteristics substantially match; and
   adjusting the second gamma characteristic of the second display panel based on the adjustment.

2. The method of claim 1, wherein identifying the first gamma characteristic further comprises:
   identifying the first gamma characteristic by applying the set of voltages to a filter.

3. The method of claim 2, wherein identifying the first gamma characteristic further comprises:
   generating a gamma figure of merit (FOM) for each of the first display panel and the second display panel after and based on applying the set of voltages to the filter.

4. The method of claim 1, wherein adjusting the second gamma characteristic comprises:
   adjusting the second gamma characteristic based on a stored nominal gamma value for the second display panel.

5. The method of claim 1, wherein adjusting the second gamma characteristic comprises:
   adjusting a bias of the second display panel based on the first gamma characteristic.

6. The method of claim 5, wherein adjusting the bias comprises adjusting a bias of a backlight of the second display panel.

7. The method of claim 5, wherein adjusting the bias comprises adjusting a bias of a light emitting diode of the second display panel.

8. The method of claim 1, wherein identifying the first gamma characteristic comprises identifying the first gamma characteristic in response to an indication of a first synchronization period of the first display panel.

9. The method of claim 8, wherein identifying the first gamma characteristic comprises completing identification of the first gamma characteristic during the first synchronization period.

10. The method of claim 1, wherein identifying the first gamma characteristic comprises identifying the first gamma characteristic at a first time and adjusting the second gamma characteristic comprises adjusting the second gamma characteristic in response to identifying the first gamma characteristic, and further comprising:
    identifying a third gamma characteristic of the first display panel at a second time after the first time, the third gamma characteristic different from the first gamma characteristic; and
    in response to identifying the third gamma characteristic, adjusting the second gamma characteristic of the second display panel based on the third gamma characteristic.

11. The method of claim 10, wherein:
    the first time corresponds to a first synchronization period of the first display panel and the second time corresponds to a second synchronization period of the first display panel.

12. A method, comprising:
    periodically measuring a first gamma characteristic of a first display panel of a head mounted display (HMD) device by applying a set of currents to a pixel of the first display panel causing the pixel to generate a corresponding set of voltages;
    periodically measuring a second gamma characteristic of a second display panel of the HIVID device by applying the set of currents to a pixel of the second display panel causing the pixel to generate a corresponding set of voltages;

identifying an adjustment to the second gamma characteristic, based on a difference between the first and second gamma characteristics, so that the first and second gamma characteristics substantially match; and periodically adjusting a bias applied to at least one pixel of the second display panel of the HMD device based on the identified adjustment, the second display panel different from the first display panel.

13. A head mounted display (HMD) device, comprising:
a first display panel having a first pixel;
a second display panel having a second pixel; and
a gamma correction module comprising:
  a sensor configured to identify a first gamma characteristic of the first display panel and a second gamma characteristic of the second display panel by applying a set of currents to the first pixel and the second pixel to generate respective sets of voltages; and
  a control module configured to:
    identify any difference between the first and second gamma characteristics based on the sets of voltages;
    when a difference is identified, identify an adjustment to the second gamma characteristic, based on the difference, so that the first and second gamma characteristics substantially match; and
    adjust the second gamma characteristic of the second display panel based on the identified adjustment.

14. The HMD device of claim 13, wherein identifying the first gamma characteristic further comprises:
identifying the first gamma characteristic by applying the set of voltages to a filter.

15. The HMD device of claim 13, wherein adjusting the second gamma characteristic comprises:
adjusting the second gamma characteristic based on the first gamma characteristic and a stored nominal gamma value.

16. The HIVID device of claim 13, wherein adjusting the second gamma characteristic comprises:
adjusting a bias of the second display panel based on the first gamma characteristic.

17. The HIVID device of claim 13, wherein:
the first and second display panels are operated to present stereoscopic virtual reality imagery.

18. The HIVID device of claim 13, wherein:
the first and second display panels are operated to present stereoscopic augmented reality imagery.

* * * * *